(12) United States Patent
Ebuchi et al.

(10) Patent No.: US 8,626,370 B2
(45) Date of Patent: Jan. 7, 2014

(54) VEHICLE CONTROL APPARATUS AND VEHICLE CONTROL METHOD

(75) Inventors: Hiroaki Ebuchi, Susono (JP); Kouji Kawashima, Kobe (JP); Hiromichi Kimura, Okazaki (JP); Tomoyuki Honda, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 609 days.

(21) Appl. No.: 12/934,512

(22) PCT Filed: Mar. 24, 2009

(86) PCT No.: PCT/IB2009/000579
§ 371 (c)(1),
(2), (4) Date: Sep. 24, 2010

(87) PCT Pub. No.: WO2009/118604
PCT Pub. Date: Oct. 1, 2009

(65) Prior Publication Data
US 2011/0054727 A1    Mar. 3, 2011

(30) Foreign Application Priority Data
Mar. 25, 2008   (JP) ................................. 2008-077990

(51) Int. Cl.
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |

(52) U.S. Cl.
USPC .................................... 701/22; 701/1; 701/58

(58) Field of Classification Search
USPC .................................................. 701/22, 1, 58
See application file for complete search history.

(56) References Cited

U.S. PATENT DOCUMENTS

2006/0003863 A1   1/2006  Tabata et al.
2008/0146408 A1*  6/2008  Tabata et al. .................... 477/35

FOREIGN PATENT DOCUMENTS

| JP | 2004 345527 | 12/2004 |
| JP | 2005 16613 | 1/2005 |
| WO | 2006 137587 | 12/2006 |
| WO | 2006/137587 A1 * | 12/2006 |

* cited by examiner

Primary Examiner — Tarcza H. Thomas
Assistant Examiner — Maceeh Anwari
(74) Attorney, Agent, or Firm — Oblon, Spivak, McClelland, Maier & Neustadt, L.L.P.

(57) ABSTRACT

A control apparatus is applied to a vehicle that has shift modes including the continuously variable shift mode, in which a ratio of the rotational speed of a power source to the rotational speed of a drive shaft is continuously adjusted, and the stepped shift mode, in which the ratio is fixed. The control apparatus includes a control unit that controls the torque that is output from the power source to make the time that is required to bring the drive torque of the drive shaft from a predetermined value to a target value in the stepped shift mode equal to the time that is required to bring the drive torque of the drive shaft from the predetermined value to the target value in the continuously variable shift mode. In this way, the difference in drivability between the continuously variable shift mode and the stepped shift mode is minimized.

14 Claims, 7 Drawing Sheets

——— : VEHICLE TRAVELS IN STEPPED SHIFT MODE
+ OUTPUT FROM BATTERY IS NOT LIMITED

—··— : VEHICLE TRAVELS IN CONTINUOUSLY VARIABLE SHIFT MODE
+ OUTPUT FROM BATTERY IS NOT LIMITED

———— : VEHICLE TRAVELS IN STEPPED SHIFT MODE
+ OUTPUT FROM BATTERY IS LIMITED (1)

VEHICLE CONTROL APPARATUS AND VEHICLE CONTROL METHOD

BACKGROUND OF THE INVENTION

1. Field of the Invention

The invention relates to a vehicle control apparatus and a vehicle control method.

2. Description of the Related Art

There are hybrid vehicles that include a motor generator, which serves as, an electric motor and a generator, in addition to an internal combustion engine (engine). In the hybrid vehicles, the internal combustion engine is operated at highest possible efficiency, and the motor generator compensates for a shortfall in a drive power or an engine braking force.

An example of such hybrid vehicles is described in Japanese Patent Application Publication No. 2004-345527 (JP-A-2004-345527). In the hybrid vehicle described in JP-A-2004-345527, the shift mode is switched between the continuously variable shift mode and the stepped shift mode. The hybrid vehicle includes a power split mechanism that is formed by combining, for example, two planetary gear mechanisms with each other. The power split mechanism is connected to an engine, a first motor generator, a drive shaft and a brake, and a second motor generator is connected to the drive shaft. When the brake is released, the engine speed is continuously adjusted by continuously adjusting the rotational speed of the first motor generator. In this case, the vehicle is driven in the continuously variable shift mode. On the other hand, when the brake is locked, the gear ratio is fixed by preventing rotation of one of the above-described rotating elements. In this case, the vehicle is driven in the stepped shift mode.

However, the drive shaft responds to the output from the engine more quickly in the stepped shift mode than in the continuously variable shift mode. Therefore, the drivability may differ between the continuously variable shift mode and the stepped shift mode.

SUMMARY OF THE INVENTION

The invention provides a vehicle control apparatus and a vehicle control method that minimize a difference in drivability between the continuously variable shift mode and the stepped shift mode.

A first aspect of the invention relates to a control apparatus for a vehicle that has the shift modes including the continuously variable shift mode, in which the ratio of the rotational speed of a power source to the rotational speed of a drive shaft is continuously adjusted, and the stepped shift mode, in which the ratio of the rotational speed of the power source to the rotational speed of the drive shaft is fixed. The control apparatus includes a control unit that controls the torque that is output from the power source to make the time that is required to bring the drive torque of the drive shaft from a predetermined value to a target value in the stepped shift mode equal to the time that is required to bring the drive torque of the drive shaft from the predetermined value to the target value in the continuously variable shift mode.

The control apparatus is applied to the vehicle that has the shift modes including the continuously variable shift mode, in which the ratio of the rotational speed of the power source to the rotational speed of the drive shaft is continuously adjusted, and the stepped shift mode, in which the ratio of the rotational speed of the power source to the rotational speed of the drive shaft is fixed. The control apparatus includes the control unit, for example, an ECU (Electronic Control Unit). The control unit controls the torque that is output from the power source to make the time that is required to bring the drive torque of the drive shaft from the predetermined value to the target value in the stepped shift mode equal to the time that is required to bring the drive torque of the drive shaft from the predetermined value to the target value in the continuously variable shift mode. The predetermined value is a value that is determined as needed, and the target value is a value that is determined as needed and that is larger than the predetermined value. Thus, the difference in drivability between the continuously variable and the stepped shift mode is minimized. As a result, it is possible to provide the drivability that does not give a sense of discomfort to a driver.

In the first aspect of the invention, the control unit may control the torque that is output from the power source in such a manner that the time that is required to bring the drive torque from the predetermined value to the target value in the stepped shift mode is increased by a predetermined time. In this case, the predetermined time is the difference between the time that is required to bring the drive torque from the predetermined value to the target value in the continuously variable shift mode and the time that is required to bring the drive torque from the predetermined value to the target value in the stepped shift mode. In the stepped shift mode, the torque output from the power source is controlled to increase the time that is required to bring the drive torque from the predetermined value to the target value by the predetermined time. In this way, the time that is required to bring the drive torque from the predetermined value to the target value in the stepped shift mode is made equal to the time that is required to bring the drive torque from the predetermined value to the target value in the continuously variable shift mode.

The control apparatus according to the first aspect of the invention may further include an energy storage unit that stores energy which is supplied to the power source. The control unit may detect an amount of energy that is able to be supplied from the energy storage unit to the power source, and may adjust the predetermined time based on the detected amount of energy. The energy storage unit is, for example, a battery. In this way, even if the output from the energy storage unit is limited, the time required to bring the drive torque from the predetermined value to the target value in the stepped shift mode is made equal to the time required to bring the drive torque from the predetermined value to the target value in the continuously variable shift mode. As a result, it is possible to provide the drivability that does not give a sense of discomfort to the driver.

The control apparatus according to the first aspect of the invention may be applied to a hybrid vehicle in which an internal combustion engine and a motor generator are provided as power sources and the shift mode is switched between the continuously variable shift mode and the stepped shift mode.

The control apparatus according to the first aspect of the invention may be applied to a hybrid vehicle which includes a first motor generator, a power split mechanism to which the internal combustion engine and the first motor generator are connected, a second motor generator that is connected to the drive shaft, and a brake that is able to lock a rotating element of the power split mechanism, in which when the brake releases the rotating element, the continuously variable shift mode where a reaction force, which corresponds to the torque output from the internal combustion engine, is output from the first motor generator is achieved, and in which when the brake locks the rotating element, the stepped shift mode where the torque output from the internal combustion engine is transferred to the drive shaft without being influenced by the reaction force output from the first motor generator is achieved. In this hybrid vehicle, if the control apparatus according to the first aspect of the invention is not provided, it takes longer to transfer the torque output from the internal combustion engine to the drive shaft in the continuously variable shift mode than in the stepped shift mode because the reaction force from the first motor generator is changed in the continuously variable shift mode. Therefore, it takes longer to bring the drive torque to the target value in the continuously variable shift mode than in the stepped shift mode. However, if the control apparatus according to the first aspect of the invention is provided, the time that is required to bring the drive torque to the target value in the stepped shift mode is increased by the predetermined time. Accordingly, the time that is required to bring the drive torque from the predetermined value to the target value in the stepped shift mode is made equal to the time that is required to bring the drive torque from the predetermined value to the target value in the continuously variable shift mode. As a result, it is possible to provide the drivability that does not give a sense of discomfort to the driver.

The control apparatus is provided in the vehicle which has the shift modes including the continuously variable shift mode, in which the ratio of the rotational speed of the power source to the rotational speed of the drive shaft is continuously adjusted by changing the reaction force that corresponds to the torque output from the power source, and the stepped shift mode, in which the ratio of the rotational speed of the power source to the rotational speed of the drive shaft is fixed. The control apparatus includes the control unit that controls the torque that is output from the power source to make the time that is required to bring the drive torque of the drive shaft from the predetermined value to the target value in the stepped shift mode equal to the time that is required to bring the drive torque of the drive shaft from the predetermined value to the target value in the continuously variable shift mode. Accordingly, the difference in drivability between the continuously variable shift mode and the stepped shift mode is minimized. As a result, it is possible to provide the drivability that does not give a sense of discomfort to the driver.

A second aspect of the invention relates to a control method for a vehicle which has the shift modes including the continuously variable shift mode, in which the ratio of the rotational speed of a power source to the rotational speed of a drive shaft is continuously adjusted, and the stepped shift mode, in which the ratio of the rotational speed of the power source to the rotational speed of the drive shaft is fixed. According to the control method, the torque that is output from the power source is controlled to make the time that is required to bring the drive torque of the drive shaft from the predetermined value to the target value in the stepped shift mode equal to the time that is required to bring the drive torque of the drive shaft from the predetermined value to the target value in the continuously variable shift mode. Accordingly, the difference in drivability between the continuously variable shift mode and the stepped shift mode is minimized. As a result, it is possible to provide the drivability that does not give a sense of discomfort to the driver.

BRIEF DESCRIPTION OF THE DRAWINGS

The foregoing and further features and advantages of the invention will become apparent from the following description of an example embodiment with reference to the accompanying drawings, wherein the same or corresponding portions will be denoted by the same reference numerals and wherein.

DETAILED DESCRIPTION OF THE EMBODIMENT

Hereafter, an embodiment of the invention will be described with reference to the accompanying drawings.

Figure 1:
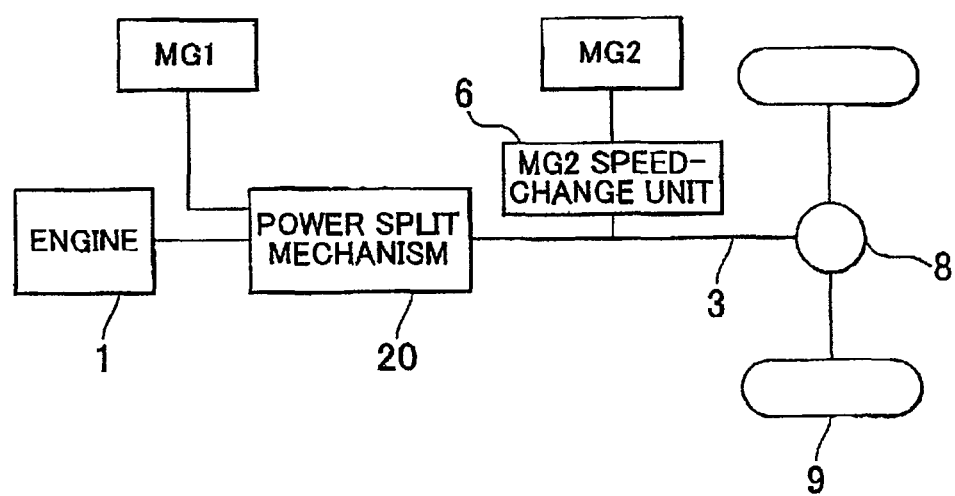
FIG. 1 is a view schematically showing the structure of a hybrid vehicle according to an embodiment of the invention.

FIG. 1 is a view schematically showing the structure of a hybrid vehicle that includes a vehicle control apparatus according to the embodiment of the invention. As shown in FIG. 1, the hybrid vehicle according to the embodiment of the invention includes an engine (internal combustion engine) 1, a first motor generator MG1, a second motor generator MG2, and a power split mechanism 20. The engine 1 and the first motor generator MG1, which serve as power sources, are connected to the power split mechanism 20. The second motor generator MG2, which serves as a power source that is used to compensate for a shortfall in a torque of the drive shaft 3 (drive torque) or a braking force, is connected to the drive shaft 3 of the power split mechanism 20. The second motor generator MG2 is connected to the drive shaft 3 via a MG2 speed-change unit 6. The drive shaft 3 is connected to right and left drive wheels 9 via a final gear reduction unit 8. The first motor generator MG1 and the second motor generator MG2 are electrically connected to each other directly or via a battery, an inverter or a controller (see FIG. 2). The second motor generator MG2 is driven by the electric power generated by the first motor generator MG1.

The engine 1 is a thermal engine that generates a drive power by burning fuel. For example, a gasoline engine or a diesel engine may be used as the engine 1. The main function of the first motor generator MG1 is to generate electric power. The first motor generator MG1 rotates using the torque from the engine 1 to generate electric power. Due to the electric power generation, a reaction force in the form of torque is generated at the first motor generator MG1. The rotational speed of the engine 1 is continuously adjusted by controlling the rotational speed of the first motor generator MG1. This shift mode is referred to as the continuously variable shift mode. The continuously variable shift mode is achieved by a differential effect produced by the power split mechanism 20, described later in detail.

The second motor generator MG2 generates a supplemental drive torque or a supplemental braking force. When generating a supplemental drive torque, the second motor generator MG2 serves as an electric motor that generates power using the supplied electric power. On the other hand, when generating a supplemental braking force, the second motor generator MG2 serves as a generator that is rotated by the torque transferred from the drive wheels 9 to generate electric power.

Figure 2:
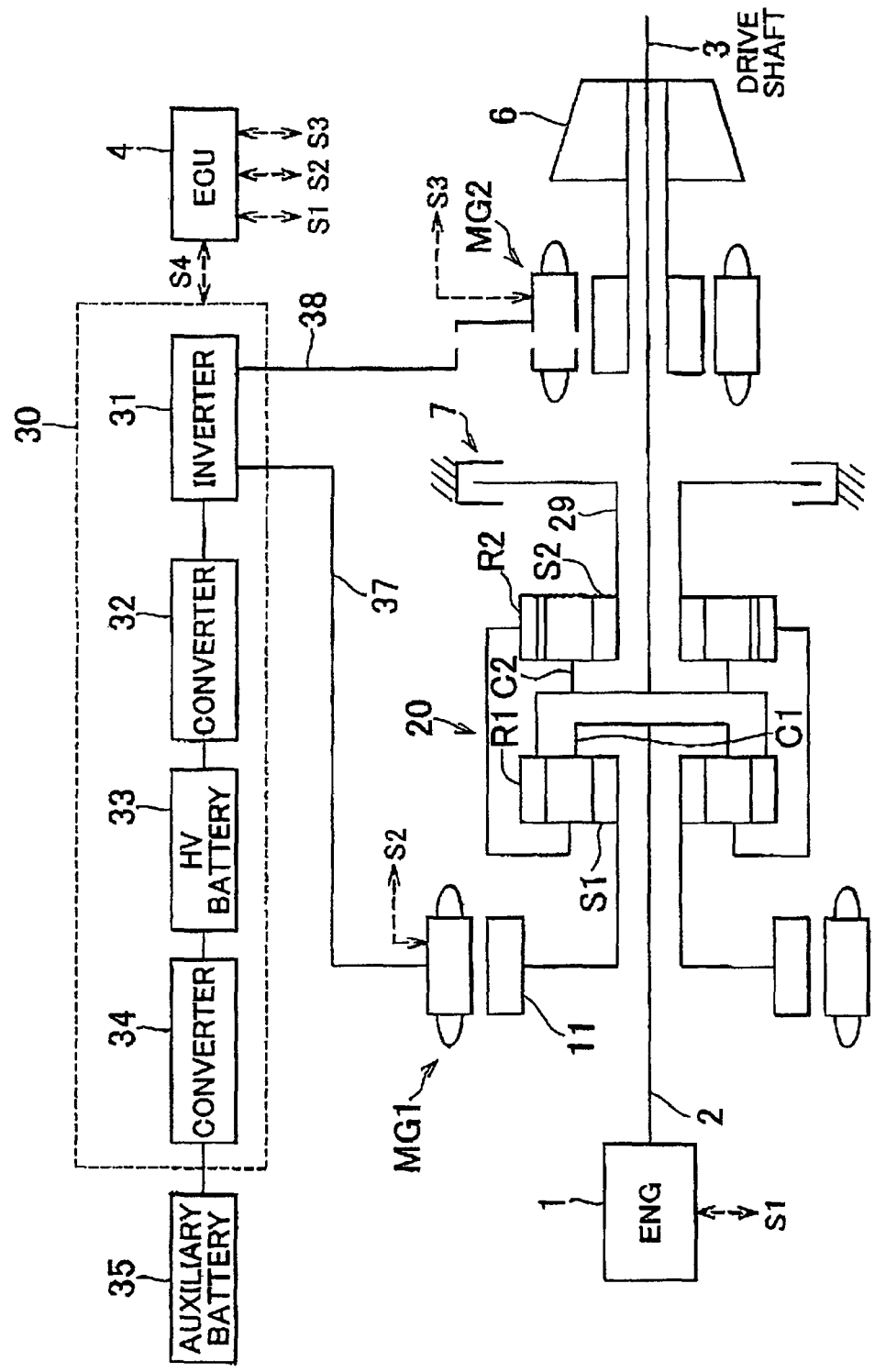
FIG. 2 is a view showing the structure of a motor generator and a power split mechanism.

FIG. 2 shows the structure of the first motor generator MG1, the second motor generator MG2, and the power split mechanism 20 shown in FIG. 1.

The power split mechanism 20 distributes the torque output from the engine 1 between the first motor generator MG1 and the drive shaft 3, and produces a differential effect. The power split mechanism 20 includes multiple sets of differential mechanisms. There are four rotating elements that produce a differential effect. The engine 1 is connected to a first rotating element, the first motor generator MG1 is connected to a second rotating element, and the drive shaft 3 is connected to a third rotating element. A fourth rotating element may be locked by a brake unit 7. The brake unit 7 is, for example, a mesh mechanism that includes an engaging element (not shown) which has a plurality of dog teeth and an engaged element (not shown) which has a plurality of dog teeth.

When the fourth rotating element is not locked by the brake unit 7, the rotational speed of the engine 1 is continuously adjusted by continuously adjusting the rotational speed of the first motor generator MG1. In this case, the continuously variable shift mode is achieved. On the other hand, when the fourth rotating element is locked by the brake unit 7, the gear ratio that is determined by the power split mechanism 20 is fixed to an over-drive gear ratio (that is, a gear ratio at which the speed of rotation output from the engine 1 is smaller than the rotational speed of the drive shaft 3). In this case, the stepped shift mode is achieved.

In the embodiment of the invention, the power split mechanism 20 is formed by combining two planetary gear mechanisms with each other, as shown in FIG. 2. A first planetary gear mechanism includes a ring gear R1, a carrier C1 and a sun gear S1. A second planetary gear mechanism is a double pinion planetary gear mechanism, and includes a ring gear R2, a carrier C2 and a sun gear S2.

An output shaft 2 of the engine 1 is connected to the carrier C1 of the first planetary gear mechanism, and the carrier C1 is connected to the ring gear R2 of the second planetary gear mechanism. The carrier C1 and the ring gear R2 constitute the first rotating element. A rotor 11 of the first motor generator MG1 is connected to the sun gear S1 of the first planetary gear mechanism. The rotor 11 and the sun gear S1 constitute the second rotating element.

The ring gear R1 of the first planetary gear mechanism and the carrier C2 of the second planetary gear mechanism are connected to each other, and connected to the drive shaft 3. The ring gear R1 and the carrier C2 constitute the third rotating element. The sun gear S2 of the second planetary gear mechanism is connected to a rotating shaft 29. The sun gear S2 and the rotating shaft 29 constitute the fourth rotating element. The rotating shaft 29 may be locked by the brake unit 7.

A power supply unit 30 includes an inverter 31, a converter 32, a HV battery 33 and a converter 34. The first motor generator MG1 is connected to the inverter 31 via a power supply line 37, and the second motor generator MG2 is connected to the inverter 31 via a power supply line 38. The inverter 31 is connected to the converter 32, and the converter 32 is connected to the HV battery 33. The HV battery 33 is connected to an auxiliary battery 35 via the converter 34.

The inverter 31 supplies electric power to or receives electric power from the first motor generator MG1 and the second motor generator MG2. During regeneration operation of the motor generators, the inverter 31 converts alternating-current electric power generated through the regeneration operation of the first motor generator MG1 and the second motor generator MG2 into direct-current electric power, and supplies the direct-current electric power to the converter 32. The converter 32 converts the voltage of the electric power supplied from the inverter 31 into an appropriate voltage, and charges the HV battery 33. During powering operation of the motor generator, the voltage of the direct-current electric power output from the HV battery 33 is boosted by the converter 32 and supplied to the inverter 31, and then supplied to the first motor generator MG1 via the power supply line 37, or to the second motor generator MG2 via the power supply line 38.

The electric power from the HV battery 33 undergoes voltage conversion at the converter 34. Then, the electric power is supplied to the auxiliary battery 35, and is used to drive various auxiliaries.

The operations of the inverter 31, the converter 32, the HV battery 33 and the converter 34 are controlled by an ECU 4. The ECU 4 transmits control signals S4 to control the operations of the elements in the power supply unit 30. Required signals indicating, for example, the conditions of the elements in the power supply unit 30 are transmitted to the ECU 4 as control signals S4. More specifically, the state of charge (SOC) of the HV battery 33, input/output limit values for the battery, etc. are translated into the control signals S4, and the control signals S4 are transmitted to the ECU 4.

The ECU 4 exchanges control signals S1, control signals S2 and control signals S3 with the engine 1, the first motor generator MG1 and the second motor generator MG2, respectively, and controls the engine 1, the first motor generator MG1 and the second motor generator MG2 based on the controls signals S1, the control signals S2, and the control signals S3, respectively. For example, the ECU 4 detects the accelerator pedal operation amount based on a control signal from an accelerator pedal (not shown), and determines the required drive torque. Then, the ECU 4 controls the engine 1, the first motor generator MG1, and the second motor generator MG2 in such a manner that the drive torque agrees with the required drive torque. Therefore, the ECU 4 serves as a control unit according to the invention. The ECU 4 transmits a control signal to a brake operation unit (not shown). The brake operation unit causes the brake unit 7 to lock or release the fourth rotating element based on the control signal.

Next, a vehicle control method according to the embodiment of the invention will be described.

Figure 3A:
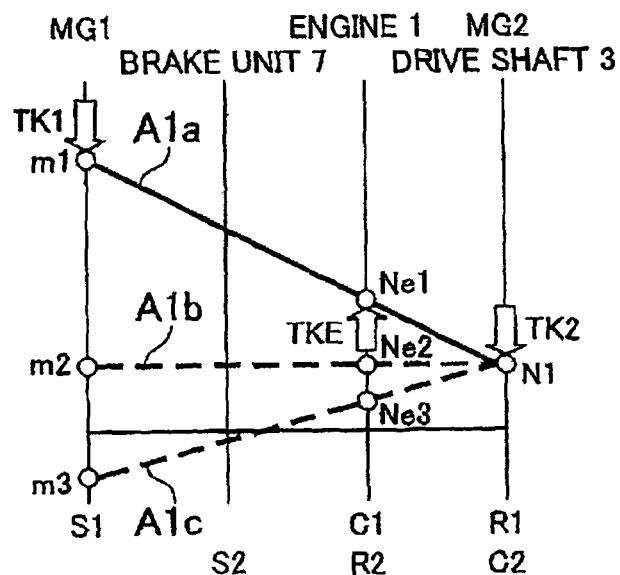
FIG. 3A is an example of a collinear diagram in the continuously variable shift mode.
Figure 3B:
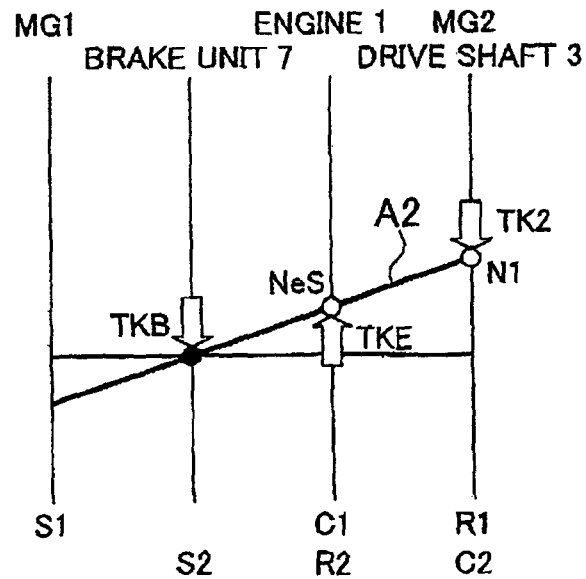
FIG. 3B is an example of a collinear diagram in the stepped shift mode.

First, the operation state of the hybrid vehicle in the continuously variable shift mode and the operation state of the hybrid vehicle in the stepped shift mode will be described with reference to FIG. 3A and FIG. 3B, respectively. FIG. 3A shows an example of a collinear diagram in the continuously variable shift mode, and FIG. 3B shows an example of a collinear diagram in the stepped shift mode. In FIGS. 3A and 3B, ordinate axes represent rotational speeds, and the upper portion represents the forward rotation.

Straight lines A1$a$, A1$b$ and A1$c$ in FIG. 3A each show an example of a collinear diagram in the continuously variable shift mode. In the continuously variable shift mode, a reaction force that corresponds to an output torque TKE from the engine 1 is output from the first motor generator MG1 as a torque TK1. A torque TK2 represents a torque that is output from the second motor generator MG2. In the continuously variable shift mode, the rotational speed of the engine 1 may be continuously adjusted by adjusting the rotational speed of the first motor generator MG1. In the case where the rotational speed of the drive shaft 3 is N1, when the rotational speed of the first motor generator MG1 is changed from m1 to m2, and then from m2 to m3, the rotational speed of the engine 1 is changed from Ne1 (>N1) to Ne2 (=N1), and then from Ne2 to Ne3 (<N1). That is, the rotational speed of the engine 1 is changed from a value that is higher than the rotational speed of the drive shaft 3 to a value that is equal to the rotational speed of the drive shaft 3, and then from the value equal to the rotational speed of the drive shaft 3 to a value that is lower than the rotational speed of the drive shaft 3. In this case, as shown by the straight line A1c, when the rotational speed of the first motor generator MG1 is a negative value, that is, when the first motor generator MG1 performs the powering operation, electric power is supplied from the second motor generator MG2 to the first motor generator MG1. If the electric power is supplied from the second motor generator MG2 to the first motor generator MG1, power transmission efficiency in the vehicle deteriorates, which reduces the fuel efficiency.

A straight line A2 in FIG. 3B shows an example of a collinear diagram in the stepped shift mode. In the stepped shift mode, because the fourth rotating element is locked by the brake unit 7, the gear ratio that is determined by the power split mechanism 20 is fixed to an over-drive gear ratio (that is, a gear ratio at which a rotational speed NeS of the engine 1 is lower than the rotational speed N1 of the drive shaft 3). At this time, a reaction force TKB that corresponds to the output torque TKE from the engine 1 is mechanically supported at the brake unit 7 because the brake unit 7 locks the sun gear S2. Therefore, the first motor generator MG1 need to be used as neither an electric motor nor a generator. As a result, the first motor generator MG1 substantially idles. Therefore, electric power need not be supplied from the second motor generator MG2 to the first motor generator MG1. Therefore, when the vehicle is traveling at a high speed in a steady state, it is possible to avoid the situation, in which electric power is supplied from the second motor generator MG2 to the first motor generator MG1, by switching the shift mode from the continuously variable shift mode to the stepped shift mode. As a result, it is possible to enhance the fuel efficiency.

When the torque output from the engine 1 rises in the stepped shift mode, the torque output from the engine 1 is transferred to the drive shaft 3 without being influenced by the reaction force output from the first motor generator MG1 because the reaction force that corresponds to the torque output from the engine 1 is mechanically supported at the brake unit 7. In contrast, in the continuously variable shift mode, the torque output from the engine 1 decreases while being transferred to the drive shaft 3 via the power split mechanism 20 because the reaction force from the first motor generator MG1 is changed. Therefore, it takes longer to transfer the torque output from the engine 1 to, the drive shaft 3 in the continuously variable shift mode than in the stepped shift mode. This will be described below with reference to FIG. 4.

Figure 4:
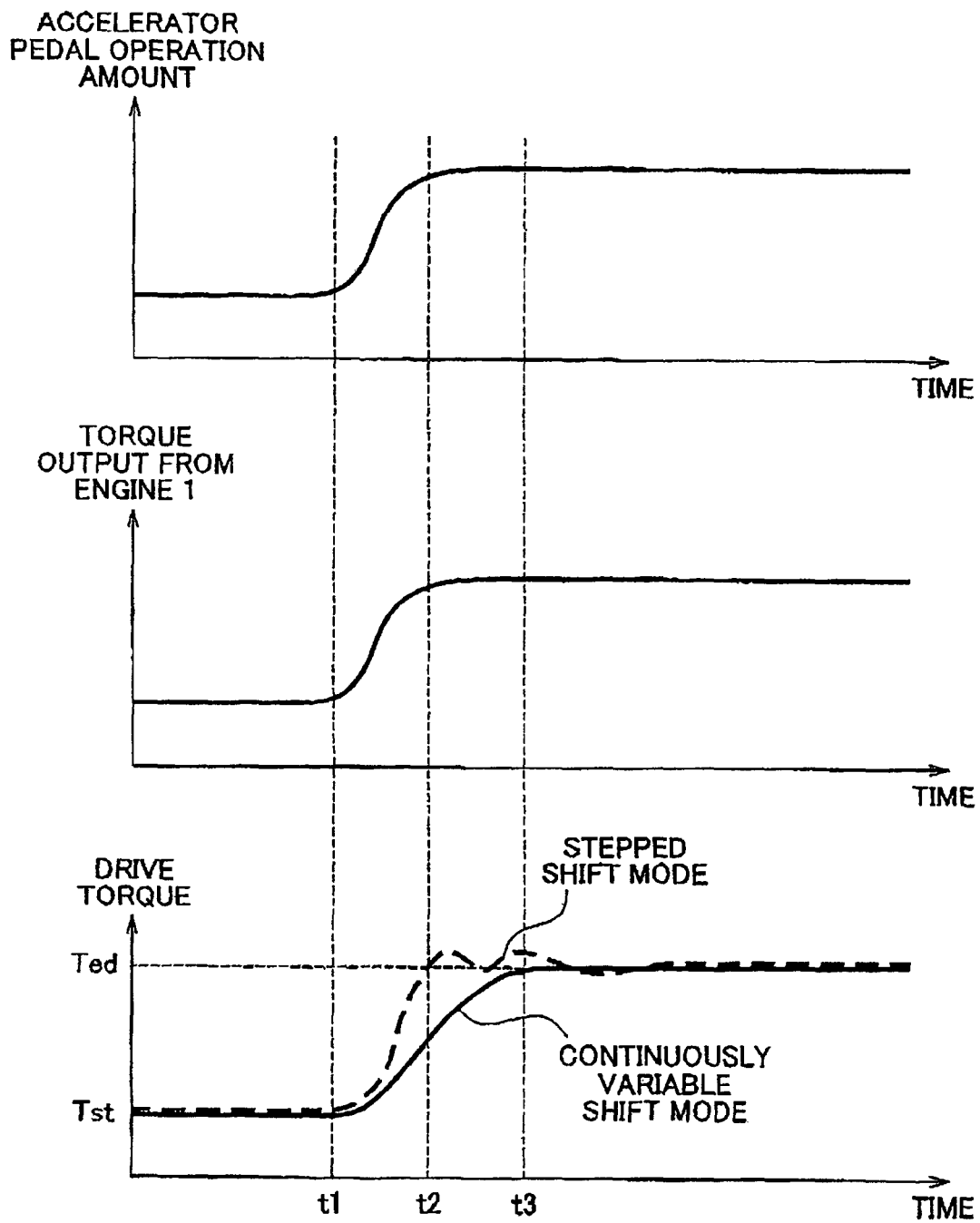
FIG. 4 illustrates graphs showing temporal changes in the accelerator pedal operation amount, the engine output torque, and the drive torque.

FIG. 4 illustrates graphs showing temporal changes in the accelerator pedal operation amount, the torque output from the engine 1, and the drive torque. The graphs in FIG. 4 show the case in which a driver depresses the accelerator pedal to increase the drive torque from a predetermined value Tst to a target value Ted. In the case shown in FIG. 4, the drive torque is increased to the target value Ted by increasing only the torque output from the engine 1 without generating supplemental torque with the use of the second motor generator MG2.

If the driver depresses the accelerator pedal at time t1, the accelerator pedal operation amount increases. The accelerator pedal operation amount sensor transmits a control signal indicating the accelerator pedal operation amount to the ECU 4. Upon reception of the control signal from the accelerator pedal sensor, the ECU 4 detects the accelerator pedal operation amount, and determines the required drive torque that corresponds to the detected accelerator pedal operation amount. As the accelerator pedal operation amount increases, the required drive torque increases. The ECU 4 transmits a control signal to the engine 1 to control the torque that is output from the engine 1 in such a manner that the drive torque agrees with the required drive torque.

In the stepped shift mode, the torque output from the engine 1 is transferred to the drive shaft 3 without being influenced by the reaction force from the first motor generator MG1. Therefore, immediately after the torque output from the engine 1 increases, the drive torque increases. As a result, the drive torque reaches the target value Ted at time t2. In contrast, the drive torque increases more moderately in the continuously variable shift mode than in the stepped shift mode. This is because, in the continuously variable shift mode, the drive torque is influenced by the reaction force from the first motor generator MG1. Accordingly, the drive torque reaches the target value Ted at time t3 that is later than time t2. As is clear from this fact, when the torque output from the engine 1 rises, the drive shaft 3 responds to the output from the engine 1 more quickly in the stepped shift mode than in the continuously variable shift mode. Therefore, the drivability may differ between the continuously variable shift mode and the stepped shift mode. As a result, the driver may feel a sense of discomfort.

Therefore, the vehicle control apparatus according to the embodiment of the invention makes the time required to bring the drive torque from the predetermined value to the target value in the continuously variable shift mode equal to the time required to bring the drive torque from the predetermined value to the target value in the stepped shift mode. This will be described in detail with reference to FIG. 5.

Figure 5:
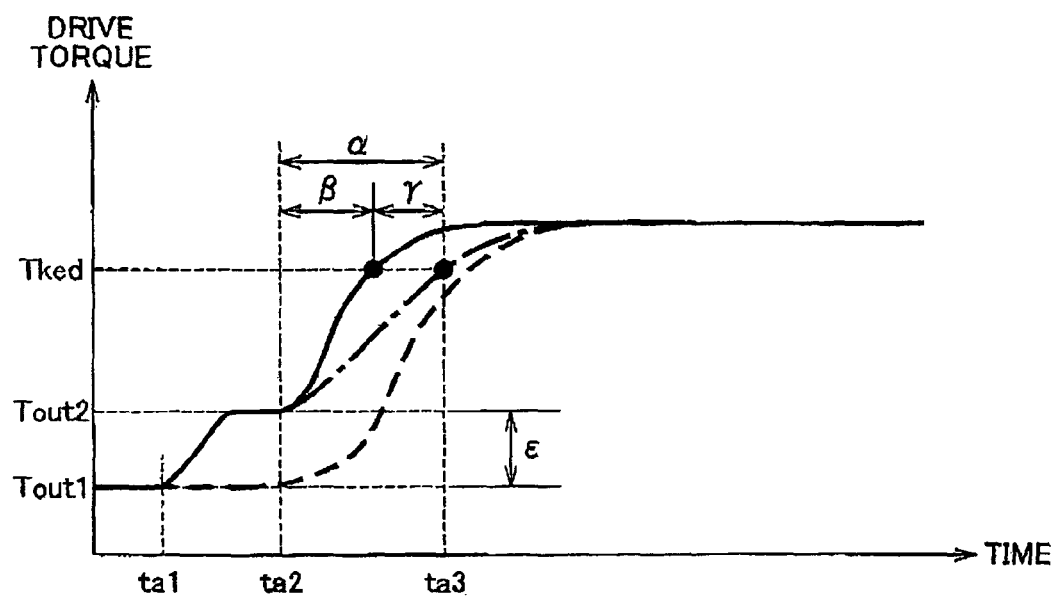
FIG. 5 is a graph showing temporal changes in the drive torque.

FIG. 5 is a graph showing temporal changes in the drive torque. More specifically, FIG. 5 is a graph that shows the temporal change in the drive torque when the drive torque is increased from a predetermined value Tout1 to a predetermined value Tout2 and then from the predetermined value Tout2 to a target value Tked in each of the stepped shift mode and the continuously variable shift mode. From the predetermined value Tout1 to the predetermined value Tout2, the torque output from the motor generator is mainly used to increase the drive torque. From the predetermined value Tout2 to the target value Tked, the torque output from the engine 1 is mainly used to increase the drive torque.

In FIG. 5, "α" represents a response time for the drive shaft 3 in the continuously variable shift mode, and "β" represents a response time for the drive shaft 3 in the stepped shift mode. "γ" represents a response time difference "α−β" between the continuously variable shift mode and the stepped shift mode. In this case, the response time for the drive shaft 3 signifies the time that is required to bring the drive torque from the predetermined value Tout2 to the target value Tked. That is, "α" represents the time that is required to bring the drive torque from the predetermined value Tout2 to the target value Tked in the continuously variable shift mode, "β" represents the time that is required to bring the drive torque from the predetermined value Tout2 to the target value Tked in the stepped shift mode, and "γ" represents the difference between the time α in the continuously variable shift mode and the time β in the stepped shift mode. "ε" represents an amount of decrease in the drive torque that is caused when the output from the HV battery 33 is limited.

The predetermined values Tout1, Tout2 and Tked are values that are set as needed. "α" and "β" are empirically determined in the form of maps that show the relationships with the predetermined value Tout2 and the target value Tked, and stored in, for example, a ROM of the ECU 4.

When the output from the HV battery 33 is not limited, in both the stepped shift mode and the continuously variable shift mode, the torque output from the motor generator (more specifically, the second motor generator MG2) is mainly used to increase the drive torque from the predetermined value Tout 1 to the predetermined value Tout 2 (from time ta1 to time ta2) in response to an increase in the required drive torque. After the drive torque exceeds the predetermined value Tout2, the torque output from the engine 1 is mainly used to increase the drive torque to the target value Tked. When the torque output from the engine 1 is mainly used to increase the drive torque, the drive shaft 3 responds to the output from the engine 1 more quickly in the stepped shift mode than in the continuously variable shift mode, as described above. Therefore, the response time $\beta$ that is required to bring the drive torque from the predetermined value Tout2 to the target value Tked in the stepped shift mode is shorter than the response time $\alpha$ that is required to bring the drive torque from the predetermined value Tout 2 to the target value Tked in the continuously variable shift mode. "ta3" in FIG. 5 represents the time at which the drive torque reaches the target value Tked in the continuously variable shift mode.

In the vehicle control apparatus according to the embodiment of the invention, the ECU 4 increases the time required to bring the drive torque from the predetermined value Tout2 to the target value Tked in the stepped shift mode. More specifically, the ECU 4 controls the engine 1 in such a manner that the rate of increase in the torque output from the engine 1 in the stepped shift mode is as low as that in the continuously variable shift mode. Thus, the ECU 4 increases the time required to bring the drive torque to the target value Tked in the stepped shift mode by the time $\gamma$. According to the embodiment of the invention, the engine 1 is controlled in such a manner that the rate of increase in the torque output from the engine 1 is changed depending on the shift mode. This control is executed, for example, according to the following method. In this method, maps that show the relationship between the required drive torque and each of the ignition timing, the intake air amount, and the fuel injection amount are prepared individually for the continuously variable shift mode and the stepped shift mode, and the ECU 4 switches the map that the ECU 4 uses between the map for the stepped shift mode and the map for the continuously variable shift mode.

In the stepped shift mode, the response time for the drive shaft 3 is "$\beta$". Therefore, if the time required to bring the drive torque to the target value Tked is increased by the time $\gamma$, the drive torque reaches the target value Tked when a time "$\beta+\gamma$ $(=\alpha)$" has elapsed after time ta2, that is, the drive torque reaches the target value Tked at time ta3.

That is, in the stepped shift mode, the ECU 4 controls the torque that is output from the engine 1 in such a manner that the time required to bring the drive torque to the target value lied is increased by the time $\gamma$ (the time required to bring the drive torque to the target value Tked is "$\beta+\gamma$"). That is, the ECU 4 controls the torque output from the engine 1 in such a manner that the drive torque reaches the target value Tked when the response time "$\beta+\gamma$", which is obtained by adding the time "$\gamma$" to the response time "$\beta$", has elapsed after time ta2. In this way, the time that is required to bring the drive torque from the predetermined value Tout2 to the target value Tked in the stepped shift mode is made equal to the time that is required to bring the drive torque from the predetermined value Tout2 to the target value Tked in the continuously variable shift mode. Thus, it is possible to reduce the difference in the response of the drive shaft 3 to the output from the engine 1 between the continuously variable shift mode and the stepped shift mode. In other words, it is possible to reduce the difference in the response of the drive shaft 3 to a change in the accelerator pedal operation amount between the continuously variable shift mode and the stepped shift mode. As a result, it is possible to provide the drivability that does not give a sense of discomfort to the driver.

In the above-described example, the ECU 4 increases the response time required to bring the drive torque to the target value Tked by the time $\gamma$ in the stepped shift mode. That is, in the stepped shift mode, the ECU 4 controls the torque output from the engine 1 in such a manner that the drive torque reaches the target value Tked when the response time "$\beta+\gamma$" has elapsed after time ta2. Alternatively, the ECU 4 may decrease the time required to bring the drive torque to the target value Tked by the time $\gamma$ in the continuously variable shift mode. That is, in the continuously variable shift mode, the ECU 4 may control the torque output from the engine 1 in such a manner that the drive torque reaches the target value Tked when a response time "$\alpha-\gamma$" has elapsed after time ta2. However, increasing the response time in the stepped shift mode is easier than decreasing the response time in the continuously variable shift mode. Therefore, increasing the response time in the stepped shift mode is more advantageous than decreasing the response time in the continuously variable shift mode.

Next, the case where the output from the HV battery 33 is limited will be described. When the output from the HV battery 33 is limited, the magnitude of torque output from the motor generator is also limited. Accordingly, the drive torque increases more moderately when the output from the HV battery 33 is limited than when the output from the HV battery 33 is not limited. Therefore, as shown in FIG. 5, the drive torque is not increased to the predetermined value Tout2 within a period from time ta1 to time ta2 in the stepped shift mode. Therefore, at time ta2, the drive torque is lower when the output from the battery 33 is limited than when the output from the battery 33 is not limited. "$\epsilon$" in FIG. 5 represents a decrease amount by which the drive torque when the output from the HV battery 33 is limited is lower than the drive torque when the output from the HV battery 33 is not limited at time t2.

In the case where the output from the HV battery 33 is not limited, the engine 1 is controlled in such a manner that the drive torque reaches the target value Tked when the response time "$\beta+\gamma$" has elapsed after time ta2, namely, in such a manner that the time required to bring the drive torque to the target value Tked is increased by the time $\gamma$. However, in the case where the output from the HV battery 33 is limited, if the engine 1 is controlled in the same manner as that in the case where the output from the HV battery 33 is not limited, there is a possibility that the drive torque does not reach the target value Tked at time ta3. As a result, the time required to bring the drive torque from the predetermined value to the target value may differ between the stepped shift mode and the continuously variable shift mode.

Therefore, in the vehicle control apparatus according to the embodiment of the invention, the ECU 4 adjusts the time $\gamma$ based on the degree of limitation on the output from the HV battery 33. More specifically, the ECU 4 determines an output limit ratio $\delta$ based on the SOC and the output limit value of the HV battery 33, and determines the drive torque decrease amount $\epsilon$ based on the output limit ratio $\delta$. Then, the ECU 4 determines a correction amount for the time $\gamma$ based on the drive torque decrease amount $\epsilon$.

The ECU 4 first determines the output limit ratio 8 based on the SOC and the output limit value of the HV battery 33. The output limit ratio $\delta$ is a ratio of the power that can be output from the motor generator to the maximum power output from the motor generator. More specifically, the output limit ratio $\delta$ is determined, for example, based on a map that shows the relationship between the SOC and the output limit value, and the output limit ratio. When the output limit ratio δ is 40%, the motor generator is able to output electric power that is only 40% of the maximum power output from the motor generator.

Next, the ECU 4 calculates the drive torque decrease amount 6 based on the determined output limit ratio 8. More specifically, the ECU 4 stores, for example, a map that shows the relationship between the drive torque decrease amount ε and the output limit ratio δ in, for example, the ROM in advance, and calculates the drive torque decrease amounts based on the output limit ratio δ with the use of the map. The ECU 4 calculates a correction amount for the time γ by multiplying the determined drive torque decrease amounts by a drive power correction coefficient ζ(ε×ζ). The drive power correction coefficient ζ is a coefficient for calculating a delay in the time at which the drive torque reaches the target value Tked, the delay corresponding to the drive torque decrease amount ε. The drive power correction coefficient ζ is obtained in advance, for example, empirically, and stored in, for example, the ROM of the ECU 4.

The ECU 4 adds a time "γ−ε×ζ", which is obtained by correcting the time γ by the correction amount "ε×ζ", to the response time β. The time "γ−ε×ζ" obtained through correction is shorter than the time γ that is used before correction. The ECU 4 controls the torque output from the engine 1 in such a manner that the drive torque reaches the target value Tked when a response time "β+γ−ε×ζ" has elapsed after time ta2, that is, in such a manner that the time required to bring the drive torque to the target value Tked is increased by the time "γ−ε×ζ". In this way, the drive torque reaches the target value Tked at time ta3. Thus, even when the output from the HV battery 33 is limited, it is possible to reduce the difference in the response of the drive shaft 3 to the accelerator pedal operation amount between the continuously variable shift mode and the stepped shift mode. As a result, it is possible to provide the drivability that does not give a sense of discomfort to the driver.

Figure 6:
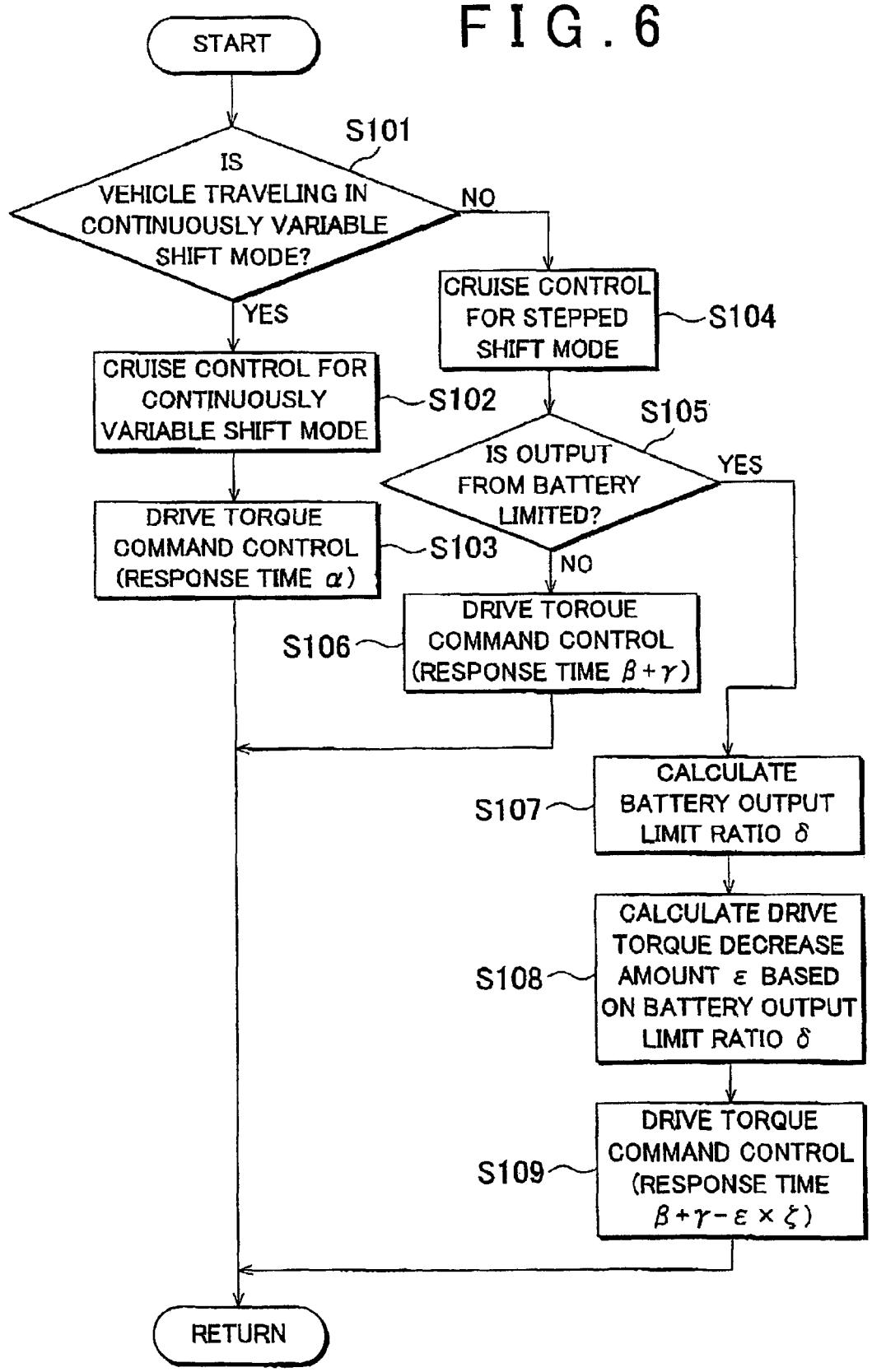
FIG. 6 is a flowchart showing a hybrid vehicle control routine according to the embodiment of the invention.

Next, a vehicle control method according to the embodiment of the invention will be described with reference to a flowchart in FIG. 6. FIG. 6 is a flowchart showing a vehicle control routine according to the embodiment of the invention.

In step (hereinafter, referred to as "S") 101, the ECU 4 determines whether the current shift mode is the continuously variable shift mode. For example, the ECU 4 determines whether the current shift mode is the continuously variable shift mode based on a control signal that is transmitted to the brake operation unit. If it is determined that the current shift mode is the continuously variable shift mode ("YES" in S101), the ECU 4 executes cruise control for the continuously variable shift mode (S102), and then executes S103.

In S103, the ECU 4 executes drive torque command control in such a manner that the drive torque reaches the target value Tked when the response time "α" has elapsed after time ta2. More specifically, the ECU 4 executes regular response control over the engine 1 (control in which the speed of response of the engine 1 is not reduced) to achieve the required drive torque. Then, the ECU 4 executes the control routine again.

On the other hand, if it is determined in S101 that the current shift mode is the stepped shift mode ("NO" in S101), the ECU 4 executes cruise control for the stepped shift mode (S104), and then executes S105.

In S105, the ECU 4 determines whether the output from the HV battery 33 is limited. More specifically, the ECU 4 determines whether the output from the HV battery 33 is limited based on the SOC and the output limit value of the HV battery 33. If it is determined that the output from the HV battery 33 is not limited ("NO" in S105), the ECU 4 executes S106.

In S106, the ECU 4 executes the drive torque command control in such a manner that the drive torque reaches the target value Tked when the response time "β+γ" has elapsed after time ta2. More specifically, the ECU 4 controls the torque output from the engine 1 in such a manner that the time that is required to bring the drive torque to the target value Tked is increased by the time γ (in such a manner that the drive torque reaches the target value Tked when the response time "β+γ" has elapsed after time ta2). Then, the ECU 4 executes the routine again. Accordingly, the difference in drivability between the continuously variable shift mode and the stepped shift mode is minimized. As a result, it is possible to provide the drivability that does not give a sense of discomfort to the driver.

On the other hand, if it is determined in S105 that the output from the HV battery 33 is limited ("YES" in S105), the ECU 4 executes S107.

In S107, the ECU 4 determines the output limit ratio δ based on the SOC and the output limit value of the HV battery 33. More specifically, the output limit ratio δ is determined based on the map that shows the relationship between the SOC and the output limit value, and the output limit ratio. The map that shows the relationship between the SOC and the output limit value is determined in advance, for example, empirically, and stored in, for example, the ROM of the ECU 4.

In S108, the ECU 4 calculates the drive torque decrease amount ε based on the output limit ratio δ. More specifically, the ECU 4 calculates the drive torque decrease amount ε based on the output limit ratio δ with the use of, for example, the map that shows the relationship between the drive torque decrease amount ε and the output limit ratio δ. The map is determined in advance, for example, empirically, and stored in, for example, the ROM of the ECU 4.

In S109, the ECU 4 calculates the correction amount for the time γ by multiplying the drive torque decrease amount ε by the drive power correction coefficient ζ, and executes the drive torque command control in such a manner that the drive torque reaches the target value Tked when the response time "β+γ−ε×ζ" has elapsed after time ta2. In other words, the ECU 4 controls the torque output from the engine 1 in such a manner that the time that is required to bring the drive torque to the target value Tked is increased by the time "γ−ε×ζ". In this way, even if the output from the HV battery 33 is limited, the difference in drivability between the continuously variable shift mode and the stepped shift mode is minimized. As a result, it is possible to provide the drivability that does not give a sense of discomfort to the driver.

Next, modifications of the vehicle control apparatus according to the above-described embodiment of the invention will be described. In the embodiment of the invention, the vehicle control apparatus according to the invention is applied to a hybrid vehicle in which the stepped shift mode is achieved when the rotating shaft 29 is locked by the brake unit 7. However, a vehicle to which the vehicle control apparatus according to the invention is applied is not limited to such a hybrid vehicle. For example, the vehicle control apparatus according to the invention may be applied to a hybrid vehicle in which the stepped shift mode is achieved when the rotation of a motor shaft of a first motor generator MG1 is locked, or a hybrid vehicle of a so-called multi-mode type that includes a stepped shift mechanism that is able to select a gear from among multiple gears in the stepped shift mode. In these types of hybrid vehicles, it is possible to avoid the situation, in which the electric power is supplied from the second motor generator MG2 to the first motor generator MG1, and enhance the fuel efficiency by switching the shift mode to the stepped shift mode when the vehicle is traveling at a high speed in a steady state.

A vehicle to which the vehicle control apparatus according to the invention is applied is not limited to a hybrid vehicle. Also, the power sources are not limited to an engine and a motor generator, and various power sources may be employed. For example, the vehicle control apparatus according to the invention may be applied to an electric vehicle in which only a motor generator is used as a power source and the engine is not used as a power source. That is, the vehicle control apparatus according to the invention may be applied to any vehicles in which the shift mode is switched between the continuously variable shift mode, in which the ratio of the rotational speed of a power source to the rotational speed of a drive shaft is continuously adjusted, and the stepped shift mode in which the ratio of the rotational speed of the power source to the rotational speed of the drive shaft is fixed. Accordingly, the shift mechanism is not limited to the power split mechanism, and another mechanism may be used as the shift mechanism.

Description will be provided concerning a case in which the invention is applied to a vehicle provided with a belt or toroidal continuously variable shift mechanism in addition to a stepped shift mechanism. In the vehicle provided with the belt or toroidal continuously variable shift mechanism in addition to the stepped shift mechanism, shifting performed with the use of the continuously variable shift mechanism is prohibited by switching the shift mode to the stepped shift mode when the vehicle is traveling at a high speed. As a result, it is possible to enhance the fuel efficiency.

Figure 7:
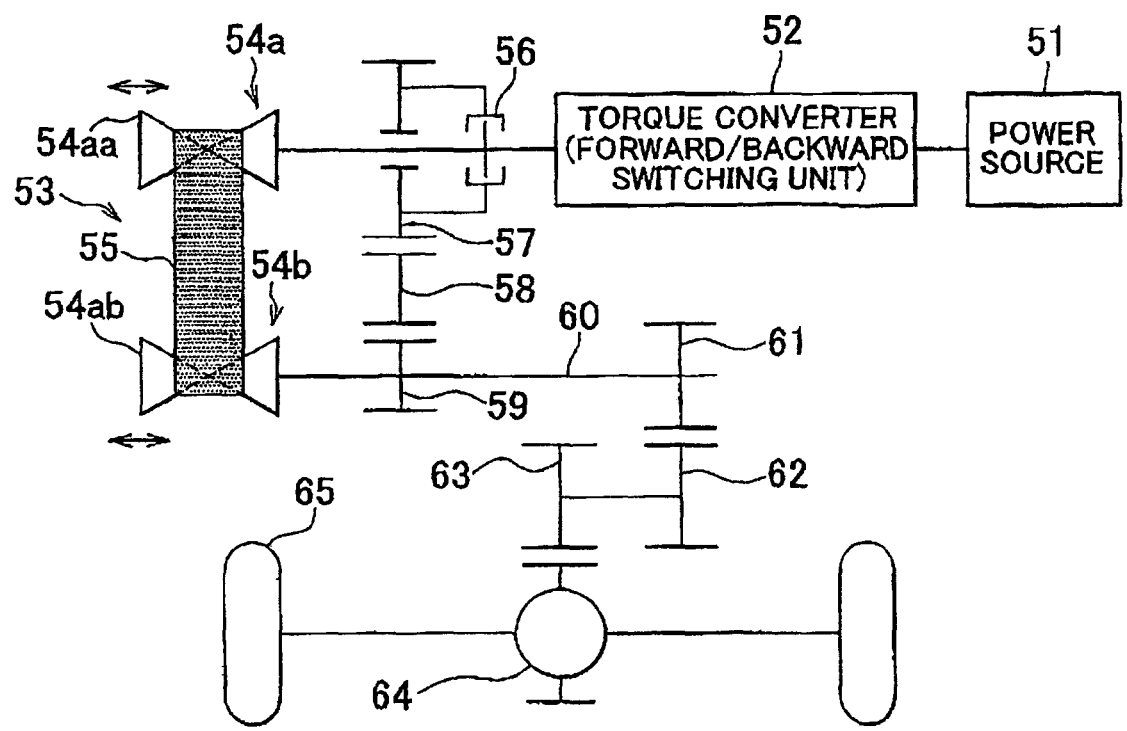
FIG. 7 is a view schematically showing the structure of a vehicle provided with a belt continuously variable shift mechanism.

FIG. 7 is a view showing an example of a vehicle that is provided with a belt continuously variable shift mechanism in addition to a stepped shift mechanism that adjusts the speed of rotation from a power source at a fixed gear ratio to achieve the stepped shift mode. The vehicle mainly includes a power source 51, a torque converter 52, a clutch 56, a continuously variable shift mechanism 53, gears 57, 58 and 59, and a drive shaft 60.

The power output from the power source 51 is transferred to the torque converter 52. The torque converter 52 connects the power source to the shift mechanism via a fluid coupling, for example, oil, and has the function of switching the vehicle travel state between the forward travel state and the backward travel state. The output from the torque converter 52 is transferred to the clutch 56. The clutch 56 is used to switch the shift mode between the stepped shift mode and the continuously variable shift mode. When the clutch 56 is disengaged, the continuously variable shift mode is achieved. On the other hand, when the clutch 56 is engaged, the stepped shift mode is achieved.

More specifically, when the clutch 56 is disengaged, the output from the torque converter 52 is transferred to the belt continuously variable shift mechanism 53. The belt continuously variable shift mechanism 53 is formed of a primary pulley 54a, a secondary pulley 54b, and a belt 55 which is made of, for example, metal and which is looped over these pulleys 54a and 54b. When a movable sheave 54aa of the primary pulley 54a and a movable sheave 54ba of the secondary pulley 54b are moved in the axial direction (direction indicated by the arrowed lines), the effective diameter of the belt changes. In this way, the speed of rotation output from the torque converter 52 is adjusted while the rotation is transferred from the primary pulley 54a to the secondary pulley 54b. The secondary pulley 54b is connected to the drive shaft 60, and the output from the secondary pulley 54b is transferred to the drive shaft 60. The output transferred to the drive shaft 60 is transferred to drive wheels 65 via gears 61, 62 and 63 and a differential gear unit 64. Thus, the continuously variable shift mode is achieved.

When the clutch 56 is engaged, the output from the torque converter 52 is not transferred to the belt continuously variable shift mechanism 53 but is transferred to the drive shaft 60 via the gears 57, 58 and 59. At this time, the speed of rotation output from the torque converter 52 is adjusted based on the gear ratio among the gears 57, 58 and 59, and then, transferred to the drive shaft 60. Therefore, the gears 57, 58 and 59 function as a stepped shift mechanism. The output transferred to the drive shaft 60 is transferred to the drive wheels 65 via the gears 61, 62 and 63 and the differential gear unit 64. Thus, the stepped shift mode is achieved.

In the vehicle provided with the above-described belt continuously variable shift mechanism, reaction forces from the pulleys, which correspond to the torque output from the power source, change due to shifting in the continuously variable shift mechanism 53. Therefore, the time that is required to bring the drive torque to the target value is longer in the continuously variable shift mode than in the stepped shift mode. Accordingly, the vehicle control apparatus according to the invention is applied to the vehicle that is provided with the belt continuously variable shift mechanism. More specifically, in the stepped shift mode, the torque output from the power source 51 is controlled in such a manner that the time that is required to bring the drive torque to the target value is increased by a predetermined time. Thus, the time required to bring the drive torque from the predetermined value to the target value in the stepped shift mode is made equal to the time required to bring the drive torque from the predetermined value to the target value in the continuously variable shift mode. Accordingly, the difference in drivability between the continuously variable shift mode and the stepped shift mode is minimized. As a result, it is possible to provide the drivability that does not give a sense of discomfort to the driver.

In the example described above, the vehicle control apparatus according to the invention is applied to the vehicle provided with the belt continuously variable shift mechanism in addition to the stepped skill mechanism. Alternatively, the vehicle control apparatus according to the invention may be applied to a vehicle provided with a toroidal continuously variable shift mechanism instead of a belt continuously variable shift mechanism. The toroidal continuously variable shift mechanism includes an input disc, an output disc, and a power roller that is clamped between these discs, and is able to perform shifting by controlling the position of the power roller. A power source is connected to the input disc, and a drive shaft is connected to the output disc. When the vehicle control apparatus according to the invention is applied to the vehicle that is provided with the toroidal continuously variable shift mechanism in addition to the stepped shift mechanism, the effect described above is obtained. That is, the difference in drivability between the continuously variable shift mode and the stepped shift mode is minimized. As a result, it possible to provide the drivability that does not give a sense of discomfort to the driver.

The vehicle control apparatus according to the invention may be applied to a vehicle provided with a torque converter. The torque converter has two modes, that is, a mode in which a power source and a transmission are connected to each other via a fluid coupling, for example, oil, whereby the speed ratio is continuously adjusted (fluid coupling mode) and a mode in which the power source and the transmission are mechanically connected to each other via a friction engaging element, for example, a lockup clutch (connection mode). When the vehicle is traveling in a steady state, the connection mode is selected so that it is possible to avoid a transfer loss that is caused when the fluid coupling is used in the fluid coupling mode. As a result, it is possible to enhance the fuel efficiency.

In the vehicle provided with the torque converter, the torque that is output from the power source is decreased by a reaction force from the fluid in the fluid coupling mode. Therefore, the time that is required to bring the drive torque to the target value is longer in the fluid coupling mode than in the connection mode. That is, in the vehicle provided with the torque converter, the fluid coupling mode corresponds to the continuously variable shift mode, and the connection mode corresponds to the stepped shift mode.

Therefore, in the vehicle provided with the torque converter, the effect described above is obtained by employing the vehicle control apparatus according to the invention. That is, in the connection mode, the torque output from the power source is controlled in such a manner that the time required to bring the drive torque to the target value is increased by a predetermined time. In this way, the time that is required to bring the drive torque to the target value in the connection mode is made equal to the time that is required to bring the drive torque to the target value in the fluid coupling mode. Accordingly, the difference in drivability between the fluid coupling mode and the connection mode is minimized. As a result, it is possible to provide the drivability that does not give a sense of discomfort to the driver.

In each of the vehicles in the modifications described above, an energy storage unit, for example, a battery, that is provided outside the power source and that is able to supply energy to the power source may be provided. When the output from the energy storage unit is limited, control that is similar to the control that is executed when the output from the HV battery 33 is limited is executed. That is, in the stepped shift mode, the amount of energy that can be supplied from the energy storage unit to the power source is detected, and the time that is required to bring the drive torque to the target value is adjusted based on the detected amount of energy that can be supplied to the power source. With this control, even when the SOC is low or the amount of energy that can be supplied to the power source is decreased due to an influence of, for example, heat, and therefore the drive torque is decreased, the difference in drivability between the continuously variable shift mode and the stepped shift mode is minimized. As a result, it is possible to provide the drivability that does not give a sense of discomfort to the driver.

The invention claimed is:

1. A control apparatus for a vehicle that has shift modes including a continuously variable shift mode, in which a ratio of a rotational speed of a power source to a rotational speed of a drive shaft is continuously adjusted, and a stepped shift mode, in which the ratio of the rotational speed of the power source to the rotational speed of the drive shaft is fixed, comprising:

a control unit that controls a torque that is output from the power source to make a time that is required to bring a drive torque of the drive shaft from a predetermined value to a target value in the stepped shift mode equal to a time that is required to bring the drive torque of the drive shaft from the predetermined value to the target value in the continuously variable shift mode.

2. The control apparatus according to claim 1, wherein the control unit controls the torque that is output from the power source in such a manner that the time that is required to bring the drive torque from the predetermined value to the target value in the stepped shift mode is increased by a predetermined time.

3. The control apparatus according to claim 1, wherein the control unit controls the torque that is output from the power source in such a manner that the time that is required to bring the drive torque from the predetermined value to the target value in the continuously variable shift mode is decreased by a predetermined time.

4. The control apparatus according to claim 2, further comprising:

an energy storage unit that stores energy which is supplied to the power source, wherein
the control unit detects an amount of energy that is able to be supplied from the energy storage unit to the power source, and adjusts the predetermined time based on the detected amount of energy.

5. The control apparatus according to claim 4, wherein, in the stepped shift mode, the control unit makes the predetermined time shorter when an output from the energy storage unit is low than when the output from the energy storage unit is high.

6. The control apparatus according to claim 1, wherein the control apparatus is applied to a hybrid vehicle in which the power source includes an internal combustion engine and a motor generator and the shift mode is switched between the continuously variable shift mode and the stepped shift mode.

7. The control apparatus according to claim 1, wherein the control apparatus is applied to a hybrid vehicle which includes a first motor generator, a power split mechanism to which an internal combustion engine and the first motor generator are connected, a second motor generator that is connected to the drive shaft, and a brake that is able to lock a rotating element of the power split mechanism, in which when the brake releases the rotating element, a continuously variable shift mode where a reaction force, which corresponds to a torque output from the internal combustion engine, is output from the first motor generator is achieved, and in which when the brake locks the rotating element, a stepped shift mode where the torque output from the internal combustion engine is transferred to the drive shaft without being influenced by the reaction force output from the first motor generator is achieved.

8. The control apparatus according to claim 7, wherein the control apparatus is applied to a vehicle in which the power split mechanism is formed of a first planetary gear mechanism and a second planetary gear mechanism, an output shaft of the internal combustion engine is connected to a carrier of the first planetary gear mechanism, and the carrier is connected to a ring gear of the second planetary gear mechanism, the first motor generator is connected to a sun gear of the first planetary gear mechanism, a ring gear of the first planetary gear mechanism and a carrier of the second planetary gear mechanism are connected to each other, and connected to the drive shaft, and a sun gear of the second planetary gear mechanism is connected to the rotating element which is able to be locked by the brake.

9. The control apparatus according claim 1, wherein the control apparatus is applied to a vehicle in which a destination of power output from the power source is switched between a continuously variable shift mechanism and a stepped shift mechanism by a clutch.

10. A control method for a vehicle that has shift modes including a continuously variable shift mode, in which a ratio of a rotational speed of a power source to a rotational speed of a drive shaft is continuously adjusted, and a stepped shift mode, in which the ratio of the rotational speed of the power source to the rotational speed of the drive shaft is fixed, comprising:

Controlling, by an electronic control unit, a torque that is output from the power source to make a time that is required to bring a drive torque of the drive shaft from a predetermined value to a target value in the stepped shift mode equal to a time that is required to bring the drive torque of the drive shaft from the predetermined value to the target value in the continuously variable shift mode.

11. The control method according to claim 10, wherein the torque that is output from the power source is controlled in such a manner that the time that is required to bring the drive torque from the predetermined value to the target value in the stepped shift mode is increased by a predetermined time.

12. The control method according to claim 10, wherein the torque that is output from the power source is controlled in such a manner that the time that is required to bring the drive torque from the predetermined value to the target value in the continuously variable shift mode is decreased by a predetermined time.

13. The control method according to claim 11, further comprising:

detecting an amount of energy that is able to be supplied from an energy storage unit of the vehicle to the power source; and adjusting the predetermined time based on the detected amount of energy.

14. The control method according to claim 13, wherein, in the stepped shift mode, the predetermined time is made shorter when an output from the energy storage unit is low than when the output from the energy storage unit high.

* * * * *